United States Patent
Ellam et al.

(10) Patent No.: US 11,568,050 B2
(45) Date of Patent: Jan. 31, 2023

(54) REGULATING EXECUTION

(71) Applicant: Hewlett-Packard Development Company, L.P., Spring, TX (US)

(72) Inventors: Daniel Ellam, Bristol (GB); Jonathan Griffin, Bristol (GB); Adrian Baldwin, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 151 days.

(21) Appl. No.: 16/754,392

(22) PCT Filed: Oct. 30, 2017

(86) PCT No.: PCT/US2017/059087
§ 371 (c)(1),
(2) Date: Apr. 8, 2020

(87) PCT Pub. No.: WO2019/088980
PCT Pub. Date: May 9, 2019

(65) Prior Publication Data
US 2020/0311269 A1 Oct. 1, 2020

(51) Int. Cl.
*G06F 21/56* (2013.01)
*G06F 21/53* (2013.01)
*G06F 21/62* (2013.01)
*G06N 20/00* (2019.01)
*G06F 21/60* (2013.01)

(52) U.S. Cl.
CPC ............ *G06F 21/566* (2013.01); *G06F 21/53* (2013.01); *G06F 21/565* (2013.01); *G06F 21/602* (2013.01); *G06F 21/6218* (2013.01); *G06N 20/00* (2019.01); *G06F 2221/033* (2013.01)

(58) Field of Classification Search
CPC ...... G06F 21/566; G06F 21/53; G06F 21/565; G06F 21/602; G06F 21/6218; G06F 2221/033; G06N 20/00
See application file for complete search history.

(56) References Cited

U.S. PATENT DOCUMENTS

| 7,565,549 B2 | 7/2009 | Satterlee et al. |
| 8,146,151 B2* | 3/2012 | Hulten ............... G06F 21/51 726/16 |
| 9,336,390 B2 | 5/2016 | Pavlyushchik |
| 9,367,687 B1* | 6/2016 | Warshenbrot ......... G06F 21/565 |
| 9,690,933 B1 | 6/2017 | Singh et al. |

(Continued)

FOREIGN PATENT DOCUMENTS

WO WO-2009108431 A1 9/2009

OTHER PUBLICATIONS

Fenton, C., Detecting Malware Pre-execution with Static Analysis and Machine Learning, Dec. 5, 2016, https://www.sentinelone.com/blog/detecting-malware-pre-execution-static-analysis-machine-learning/.

*Primary Examiner* — Robert B Leung
(74) *Attorney, Agent, or Firm* — Knobbe, Martens, Olson & Bear, LLP

(57) ABSTRACT

There is disclosed a method, computer program product and a system for regulating execution of a suspicious process, comprising determining a file system location of an executable file associated with the suspicious process, encrypting the file, and creating a wrapper for the file with the same file name and location as the file associated with the suspicious process.

13 Claims, 6 Drawing Sheets

(56) References Cited

U.S. PATENT DOCUMENTS

| | | |
|---|---|---|
| 9,747,447 B2 | 8/2017 | El-Moussa |
| 10,853,350 B1 * | 12/2020 | Sharifi Mehr .......... H04L 63/10 |
| 2007/0283192 A1 | 12/2007 | Shevchenko |
| 2009/0300761 A1 * | 12/2009 | Park ..................... G06F 21/562 |
| | | 726/23 |
| 2010/0175133 A1 | 7/2010 | Ness et al. |
| 2012/0210443 A1 * | 8/2012 | Blaisdell ................. G06F 21/54 |
| | | 726/27 |
| 2015/0215335 A1 | 7/2015 | Giuliani et al. |
| 2017/0118233 A1 * | 4/2017 | Abdulhayoglu ........ G06F 21/53 |
| 2017/0235967 A1 | 8/2017 | Ray et al. |
| 2019/0065745 A1 * | 2/2019 | Araujo ................... G06F 21/64 |

* cited by examiner

REGULATING EXECUTION

BACKGROUND

Malware has become one of the most prominent threats facing users of the internet. As cyber-attacks are becoming increasingly incentivised, the sophistication and technical investment attackers make into their attack tools is also increasing. Once a machine is infected, malware can covertly launch and take actions to hide. For example, a malware detection may include a two-stage monitoring system where, following a pre-approval stage, a program in execution is monitored at the kernel level. The increase in sophistication, the prevalence of malware and anti-antivirus techniques is leading the security industry away from traditional malware detection techniques (e.g. using signatures, heuristics, etc.) and towards alternatives such as machine learning (ML) and behavioural approaches.

BRIEF DESCRIPTION OF THE DRAWINGS

Various features of certain examples will be apparent from the detailed description which follows, taken in conjunction with the accompanying drawings, which together illustrate, by way of example only, a number of features, and wherein.

DETAILED DESCRIPTION

Figure 1A:
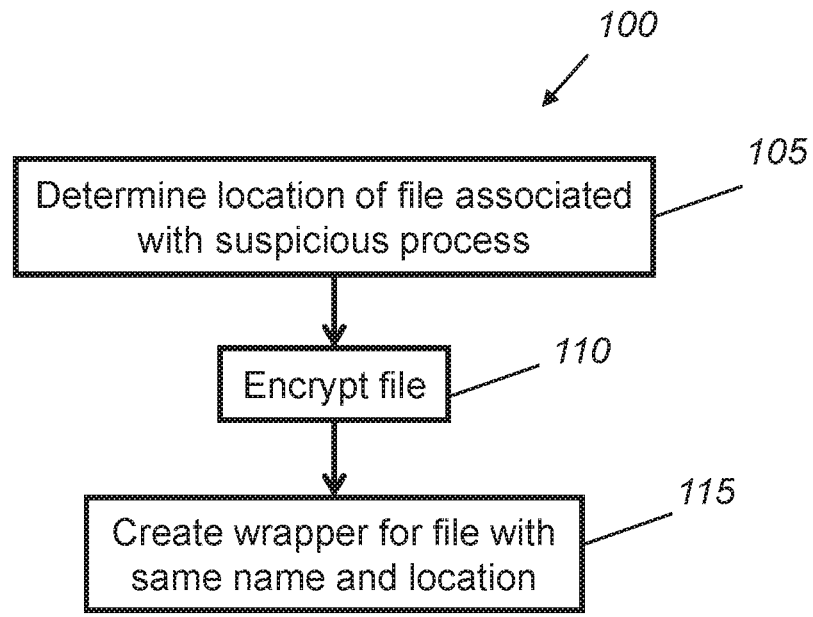
FIGS. 1A-H are flow charts each showing a method for regulating execution of a suspicious process according to examples.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

An endpoint device (e.g. laptop, workstation, printer, mobile phone, IoT device, etc.) may be equipped with malware detection systems capable of identifying a suspicious process. When a behavioural process has determined that there is reasonable but not conclusive evidence of malicious intent, a suitable response can be deployed. Such responses can include one of two high-level approaches: (i) detect and passively report an alert to a security team for subsequent analysis by a human security expert, i.e. do nothing and wait for a human security expert to take action, or (ii) automatically block the perceived threat by deleting or 'quarantining' the suspicious file, i.e. block/kill/delete the offending code. The former option is the favoured option for behavioural detection techniques. The latter option is often taken by an antivirus (AV) on-access scanners (OAS) and other subsystems when there is a high-degree of certainty in the quality of the alert.

The industry is moving towards behavioural systems which favour the approach of detection and passively reporting an alert to a security team for later analysis by a human security expert. In the situation where a detection has reasonable, but not certain evidence to support its detection, then neither of the two typical response options outlined above are ideal. Hence, there exists a disconnect between behavioural detection on the endpoint and appropriate follow-on actions to remediate.

According to an example, there is provided a system to control or regulate execution of a process detected as potentially suspicious. A method to regulate the execution of a file that has been determined by a machine learning (ML) process as potentially dangerous is also provided. Instead of a suspicious process (e.g. piece of malware) being killed off by antivirus (AV) or flagged to a user, a file associated with the process (e.g. an executable, dll, etc.) is encrypted and wrapped. That is, a wrapper that can be used to execute the file associated with a suspicious process is generated with the same name and in the same location as the file associated with the potentially suspicious process. The location may be a location within the same file system as the file associated with a suspicious process. In an example, the file associated with a suspicious process is moved to another location (or quarantined) and encrypted so that it cannot be executed without instructions passing via the wrapper and it being unencrypted. The encryption key is securely stored, and the wrapper provides functionality to enable the process to be executed and further analysed. This enables some data about the suspicious process to be farmed in a safe way. In an example, the file associated with a suspicious process can be executed in a virtual machine (VM) or other execution environment.

In an example, the system can take specific actions to lock the execution of a suspicious process, ensuring that it can only execute if the proposed system allows it to, based on the most up to date information. That is, the system can take control of the launching of an executable file, which may also include a macro embedded within another file such as word processing document for example, and is able to perform a number of intelligence gathering steps—some may be automated, some may involve the user—to make a decision over whether to launch the suspicious process or not.

FIG. 1A shows an example of a method for regulating execution of a suspicious process according to an example. At block 105 the location of a file associated with the suspicious process is determined. Prior to this, the process may have been determined as potentially suspicious using a ML process for example.

Figure 1B:
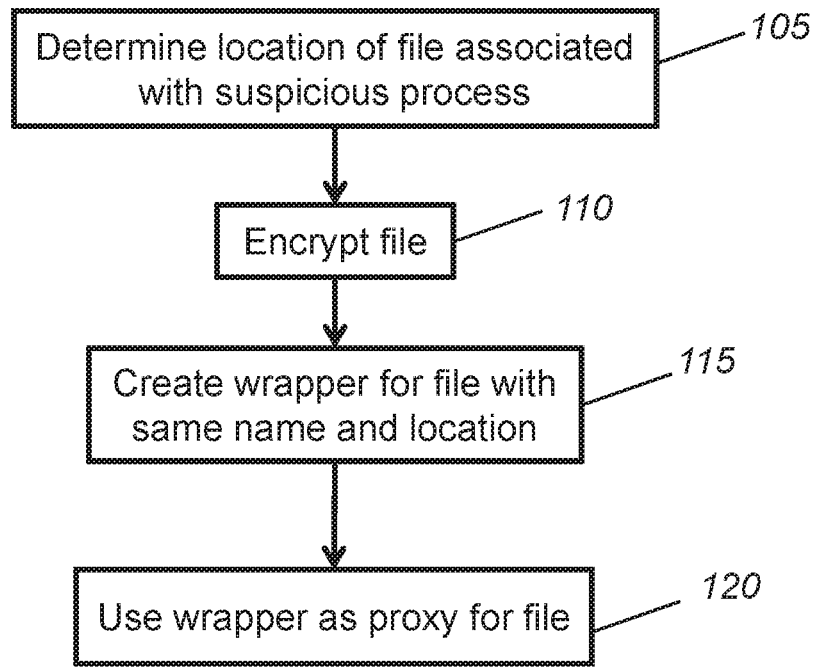

The file associated with the suspicious process is encrypted at block 110 using any suitable encryption routine. The encryption process may use an encryption key K which may be stored securely and accessible only to an authorised user of the system. At block 115 an executable wrapper is for the file associated with the suspicious or malicious process. The executable wrapper has the same file name and same location as the original file associated with the suspicious process. As noted in FIG. 1B, the wrapper can be used or characterised as a proxy for the file associated with the suspicious process.

Further aspects are described below with reference to FIGS. 1C to 1H. In these figures, blocks 105, 110 and 115 are the same as those described above with reference to FIGS. 1A and 1B. Those aspects will not therefore be discussed again. Rather, the additional aspects are described with reference to FIGS. 1C to 1H.

Figure 1C:
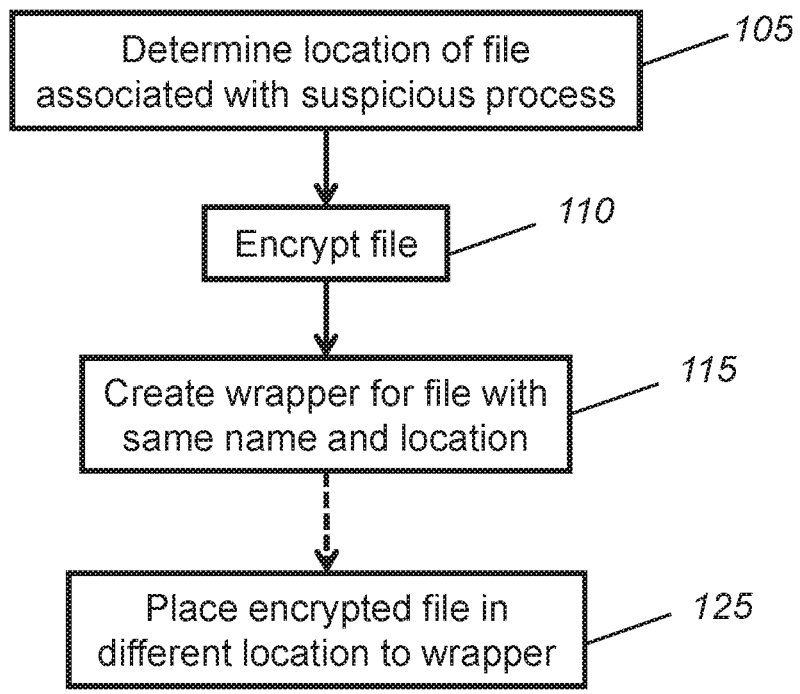

FIG. 1C shows a method for regulating execution of a suspicious process according to an example, where the file associated with the suspicious process has been encrypted and placed in a different location to the location of the wrapper. Since the wrapper is assigned the same location as the original/suspect file, any process attempting launch the original/suspect file will still 'see' it, however, it will not be the original executable. Therefore, when the OS receives a command to launch the original/suspect executable (human-driven or otherwise), it will instead execute the wrapper that has been created and put in its place.

Figure 1D:
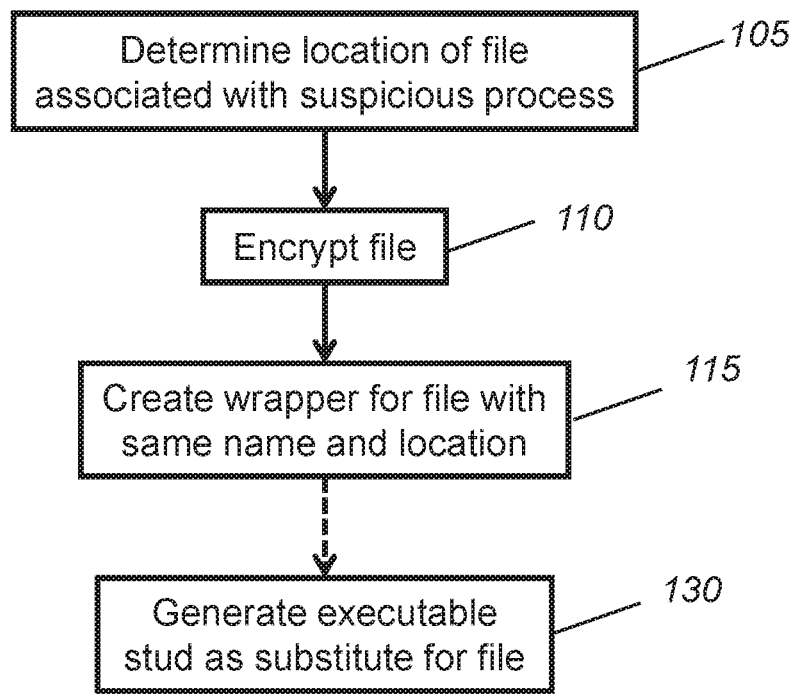

FIG. 1D shows block 130 in which an executable stub is generated as a substitute for the file associated with the suspicious process, according to an example. The stub is a wrapper or executable program. The stub or wrapper is used to execute the suspect file in a number of ways. In an example the wrapper can behave like a packer, where, for example, the original file, e.g. 'malicious.exe' is contained in the wrapper executable. If, after applying logic, the wrapper executable makes the decision to run the original executable, then it can do so by mimicking a Windows Loader functionality for example. The wrapper may contain internal logic to automate and make decisions based on: a) submitting the original exe to the locally installed AV system; b) sending a hash of the exe to an AV system, which may be cloud based for example; and/or c) searching for information contained on an external network relating to the original file.

Figure 1E:
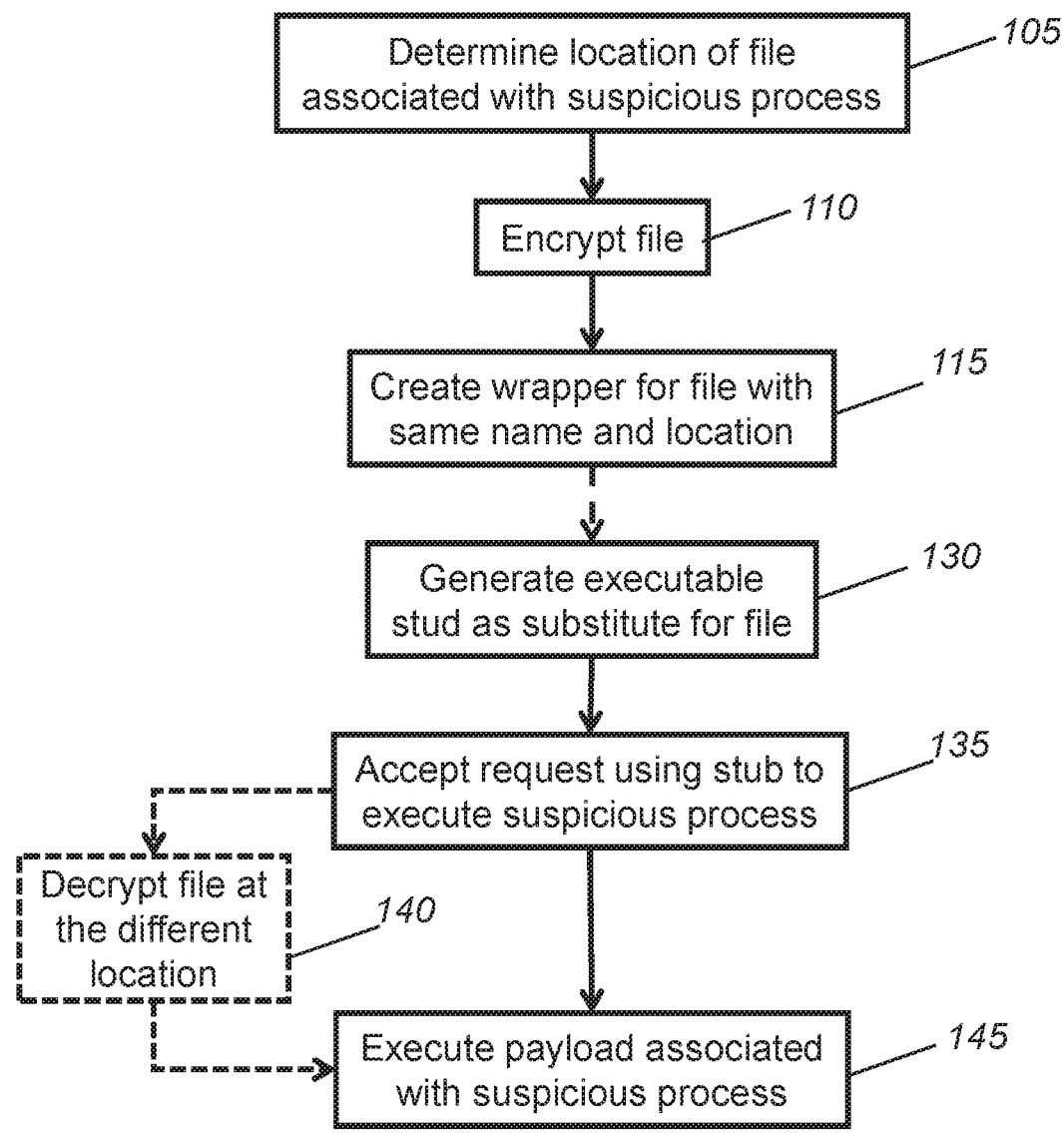

As shown in FIG. 1E, once the executable stub has been generated as a substitute for the file associated with the suspicious process, at block 135 a request may then be accepted to use the stub to execute the suspicious process. At block 140 if the original/suspect file has been encrypted, the encryption key K can be retrieved and used to decrypt the original file. The original file may have been placed in a different location to that of the wrapper executable, and so can be decrypted and/or executed at that location. At block 145 a payload associated with the suspicious process is executed.

Figure 1F:
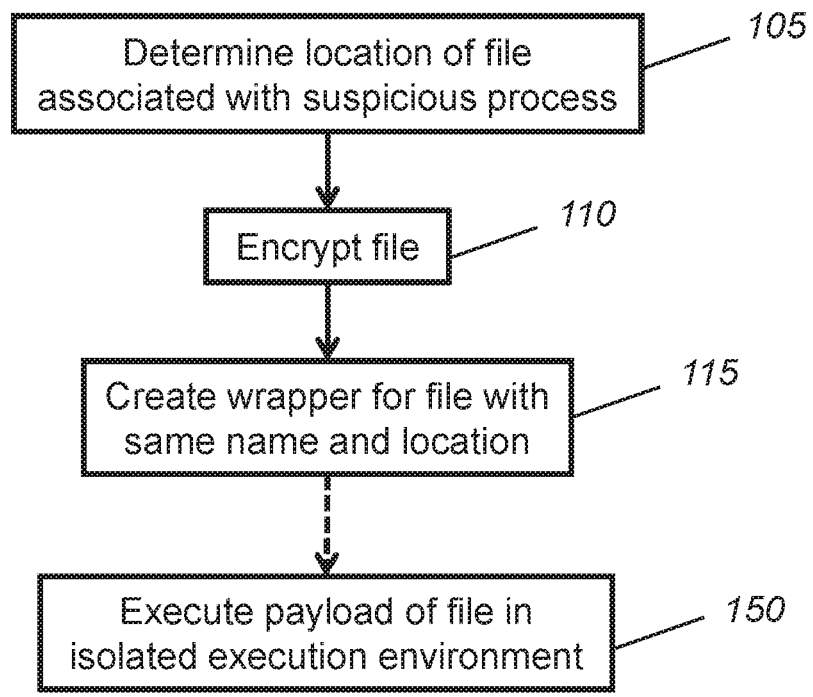

In the example of FIG. 1F, the payload of the original file associated with the suspicious process may be executed in an isolated execution environment at block 150. For example, the original executable may be run in a virtual machine (VM) environment or other "quarantined" environment remote from the core OS. As such, execution of the suspicious process can be performed in a manner that does not compromise the system.

Figure 1G:
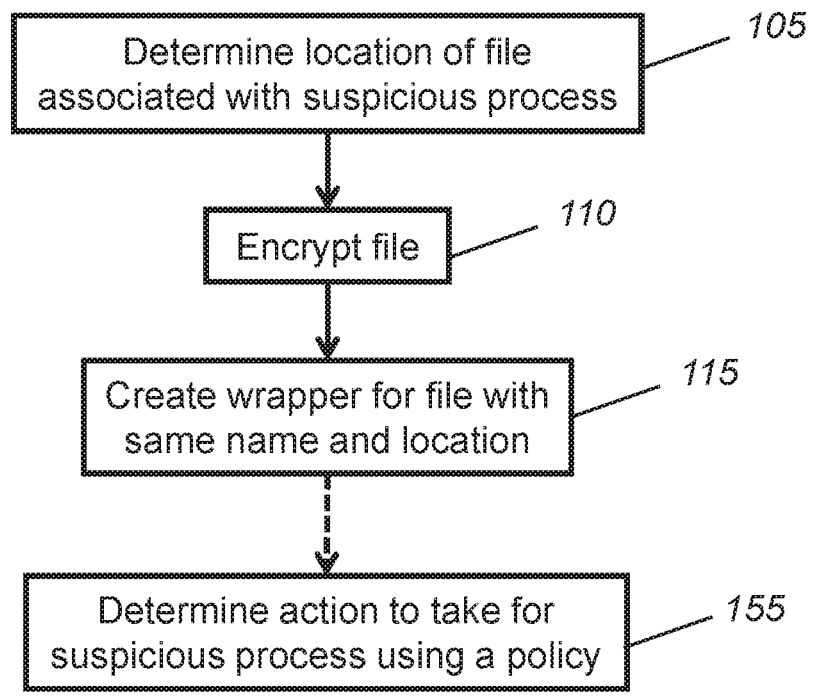

FIG. 1G shows an example method for regulating execution of a suspicious process in which at block 155 it is determined what action to take for the suspicious process using a policy. For example, this may be a corporate policy. The policy may include information such as when and whether the user is consulted or whether it may run the original executable depending on geography and location. The policy may be configured to receive other configurable parameters of the system.

In an example, the wrapper contains internal logic to decide whether to permit the execution of the original file. This may involve asking the user by displaying a warning message when the wrapper is executed. A message may only be displayed to a user when the suspect exe is executed. This message gives the user the opportunity to confirm or suppress the execution action. If the user confirms that the associated process is legitimate, the encryption/decryption key K can be fetched and the original file decrypted to launch the executable. In an example, the user message can be secured such that malware cannot separately interfere with the message.

Thus, in an example, the wrapper can be used to policies etc. However, this can also be performed in cooperation with the OS. For example, the wrapper could call a syscall in the kernel (if one exists) or a different OS service that can manage keys and execute policies and then if the policies allow, return the key back to the wrapper. That is, the wrapper may use OS services/functions to coordinate locations, key management and policy execution.

Figure 1H:
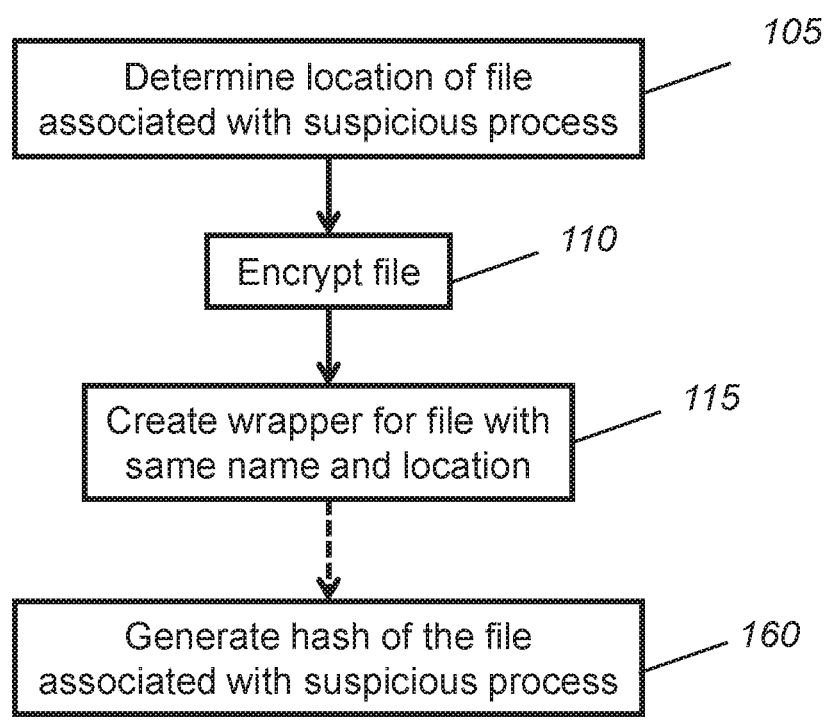

In the example of FIG. 1H, at block 160 a hash of the original executable or file associated with the suspicious process is generated. A hash of the original suspicious executable may be stored and optionally later submitted to AV when fresh AV definitions are available or have been downloaded. This removes the need to expose the original suspicious file to the system again. The hash of the file (and possibly other data) may be sent to a cloud backend for further analysis, e.g. by a human security expert. The file metadata may then be checked for indicators and fed back to the system on the endpoint. For example, the file may be checked against freely available information such as other security vendor's websites and other data stored in the cloud backend. In an example, various data may be stored in the cloud backend from which additional analytics can be built, used for telemetry, customer feedback, and/or learn/tune ML techniques using labelled data generated from knowing afterwards whether a file was malicious or legitimate. Whilst the original file is 'wrapped', if it is indeed malicious then AV may not detect it. By storing a hash it can be submitted to the AV when fresh definitions are downloaded without having to decrypt the file and potentially exposing the system.

Figure 2:
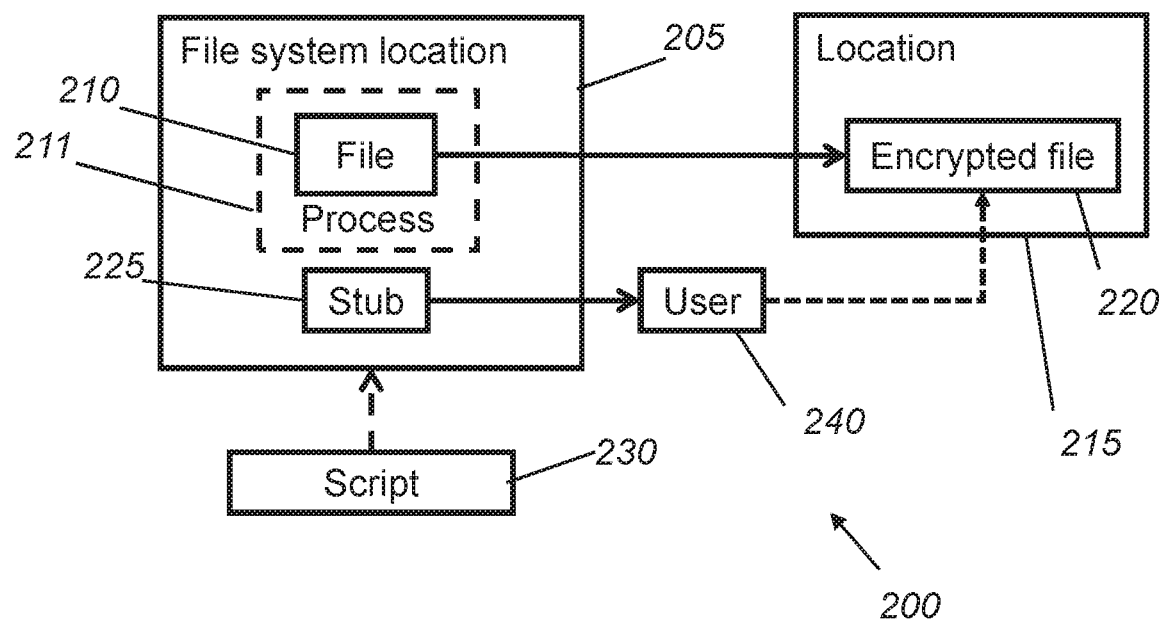
FIG. 2 is a schematic showing a system for regulating execution of a suspicious process according to an example.

FIG. 2 shows a system 200 for regulating execution of a suspicious process according to an example. A file system location 205 may contain a file 210 associated with a process 211, which has been determined as suspicious using an AV system. According to an example, the file 210 is moved to another location 215. It can be encrypted 220 before or after it is moved to this location, using an encryption key K. A stub 225 having the same file name as the suspect file is created in location 205.

Execution of, for example, a script 230 associated with the suspicious process 211 will therefore identify the stub 225 instead of the file 210, since the stub has the name and location expected by the script 230 and process 211. Accordingly, execution of the script 230 will not drop another copy of file 210.

That is, in replacing file 210 with another file with the same name in the same location, the process 211 will seek to execute the stub 225 in the belief that it is the file 210. By decoupling the actual file 210 from the process 211, any malicious intent can be regulated by providing a gateway, in the form of the wrapper or stub 225, between the encrypted file 220 and the process 211 seeking to execute it. In an example, a user 240 may be notified via a message allowing the user the option to execute the suspect file or not.

In the following example, a detection of a suspicious process may have already occurred in which it has been identified that a process is suspicious. This process may be an .exe, macro or .dll file for example, or more generally some script. The process identified as being suspicious may be called "malicious.exe". The system can perform the following remediation actions:

1. Locate malicious.exe in file system 205. For example: C:\Users\<user>\AppData\Local\Temp\malicious.exe
2. Encrypt the file 210 using any suitable encryption routine with a key K
3. Store K securely, leaving K inaccessible to operating system (OS) processes outside of a trusted infrastructure
4. Create a wrapper executable 225 around malicious.exe, with the same name and location as the original suspicious exe. In this example, the wrapper would be C:\Users\<user>\AppData\Local\Temp\malicious.exe. The wrapper may contain functionality to:

a. Display a warning to a user and receive user input
b. Optionally; consult corporate policy on what action to take on suspicious files
   i. When and whether the user is consulted
   ii. Whether it may run depending on geography and location
   iii. Receive other configurable parameters of the system
c. Fetch the key K from the trusted infrastructure
d. Decrypt the suspect executable 220
e. Launch the original suspect executable
f. Store a hash of the original suspicious executable and submit it to AV in the future when fresh AV definitions download, without needing to expose the original suspicious file to the system again.
g. Send a hash of the file and other data to a cloud backend for further analysis
   i. Check file metadata for indicators and feed back to the system on the endpoint
   ii. Check against freely available information such as other security vendor's websites and other data stored in the cloud backend
   iii. Store various data in the cloud backend from which additional analytics can be built, use for telemetry and customer feedback, and learn/tune ML techniques using labelled data generated from knowing afterwards whether a file was malicious or legitimate
h. After 'some acceptable time period', optionally restore the original exe 5. When the OS receives a command to launch the original executable (human-driven or otherwise), it now must go through the wrapper that has been created.

The approaches for regulating the execution of a suspicious process described herein disable the ability to directly execute the original file since the wrapper acts as a control point and the file cannot be launched without the wrapper allowing it to launch (whether via human intervention or otherwise). The original file can still be executed if permitted by the wrapper. Any process, or person, wanting to execute the original file will still 'see' the file but instead go through the wrapper. This is a consequence of the deliberate choice to give the wrapper the same name and location as the suspect file. This means that malware persistence mechanisms will now launch the wrapper instead, but not realise that the malware did not execute. This is advantageous since if a loader is present in the malware it may recognise when the file is deleted and simply drop it again. In an example, for a period time, it may be chosen to simply not restore the file for security reasons. Instead, the launching can still be controlled via the wrapper for a period of time.

The present disclosure has a number of advantages over a system which simply 'quarantines' a suspicious file. For example, if the file is indeed suspicious, by deleting and removing the file, if there is a launcher, then it will no longer be able to simply drop the file again freshly obfuscated into a different location due to the provision of a wrapper having the same name and location as the original file. For example, deletion of malware may not necessarily remove the malware since the malware can install itself on an operating system so that it restarts upon reboot. A malware script may be present that initially executes and then launches malware binary, however, if it detects that its malware.exe no longer exists then it may simply drop it again. Hence, deleting the original malicious binary does not always clean the system. According to the present disclosure, when the wrapper is executed, it allows tracing back to what executed it. Since the suspicious exe is now launched by the wrapper (and so is a child process), it is easier to track, suspend and terminate the suspicious process. This allows it to locate and remove the persistence mechanism, i.e. what launches the suspicious file and hence successfully cleaning the system. This is also particularly advantageous in circumstances in which the original file was detected through behavioural mechanisms since there is no guarantee that the original file would be detected a second time if it was indeed dropped again.

In an example where a user may incorrectly label the original file as benign, by controlling the execution of the original file via the wrapper it helps to slow down a malware attack. This is in contrast to a quarantine method in which a suspicious program may be free to execute in the future and allow an attacker to freely entrench further. Further, quarantine could remove the file immediately which may be an issue in the case of a false positive. The present disclosure reserves the ability to prompt the user with a warning message again in the future, or even bypass the user's recommendation, to help slow the attack. Further, the file can be kept safely knowing that its execution is controlled via the wrapper/user, providing a guard against false positives and allowing time to collect more information, e.g. from cloud analytics or a human analyst, to make a more informed decision before deleting the file. There is no way that the malware can execute without the wrapper allowing it, meaning that deletion of the file can be delayed in the event of a false positive. By keeping the original file but controlling the execution of the original file, additional time is afforded for identifying the program or what is launching the suspicious process. This allows the wrapper or user to get to the root cause and permanently remove the malware threat.

In an example, the user does not necessarily need to be consulted until a suspect file is attempted to be executed, by which time AV definitions may detect it or give it the all-clear. Further, since a message can be notified to the user, he or she can always be aware of the location of a particular program, even if a legitimate file has been wrapped.

The present disclosure provides a collection of more suitable follow-up actions to investigate and contain a threat. The methods described herein are suitable for use in circumstances where machine learning or other behavioural techniques are used to detect malware, where processes are deployed at the edge, and/or where either taking no action (other than reporting to a human analyst for later investigation) nor blocking completely are seen as suitable responses to the detection, i.e. in the case where neither (i) detecting and passively report an alert to a security team for later analysis by a human security expert, nor (ii) automatically blocking the perceived threat by deleting or 'quarantining' the suspicious file are suitable responses.

The methods described provide suitable remediation actions when the threat recognised by a behavioural analytic (or ML process) has reasonable evidence but not complete confidence that the code is malicious. The remediation action can be proportional to the threat and can be made in near-real time. The remediation system can be present on the endpoint and can have enough intelligence to take the appropriate action in real-time, without the immediate need for intervention by an expert human analyst. This removes the shifting of potential false-positive detections to the security expert and hence frees up resources for use elsewhere, especially since passively reporting an alert to a security team for later analysis by a human security expert has the downside of not offering a real-time response (some IT departments can take weeks to respond to an alert, by which time it may be too late).

The methods described herein reduces the risk of causing system instability or impeding the user since the original file if legitimate can still be executed, but only via the wrapper code. While signatures provide relatively high confidence that what they have detected is malware, by their nature, behavioural approaches to malware detection generally do not, and cannot, provide a similar degree of certainly. The methods described herein therefore deal with such problems introduced by ML and behavioural analytics and especially instances of false-positives. The present disclosure removes the risk associated with blocking legitimate software in the event of a false-positive detection.

Examples in the present disclosure can be provided as methods, systems or machine-readable instructions. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus (for example, that shown in FIG. 2) may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 3:
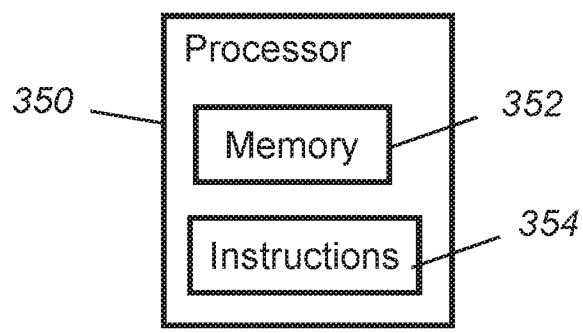
FIG. 3 is a schematic of a processor associated with a memory according to an example.

FIG. 3 shows an example of a processor 350 associated with a memory 352. The memory 352 comprises computer readable instructions 354 which are executable by the processor 350.

Such machine-readable instructions may also be loaded onto a computer or other programmable data processing devices, so that the computer or other programmable data processing devices perform a series of operations to produce computer-implemented processing, thus the instructions executed on the computer or other programmable devices provide a operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for regulating execution of a suspicious process, the method comprising:
   determining a file system location of an executable file associated with the suspicious process;
   encrypting the file associated with the suspicious process;
   creating a wrapper for the file associated with the suspicious process with the same file name and location as the file associated with the suspicious process; and
   placing the encrypted file associated with the suspicious process in a different location to the wrapper.

2. A method as claimed in claim 1, further comprising:
   using the wrapper as a proxy for the executable file associated with the suspicious process.

3. A method as claimed in claim 1, wherein creating a wrapper further comprises:
   generating an executable stub as a substitute for the file associated with the suspicious process.

4. A method as claimed in claim 3, further comprising:
   accepting a request, using the stub, to execute the suspicious process; and
   executing a payload associated with the suspicious process.

5. A method as claimed in claim 4, wherein executing a payload associated with the suspicious process further comprises:
   decrypting the file associated with the suspicious process at a different location.

6. A method as claimed in claim 1, further comprising:
   executing a payload of the file associated with the suspicious process in an isolated execution environment.

7. A method as claimed in claim 1, further comprising:
   determining an action to be taken in respect of the suspicious process using one of a: policy; hash; metadata; machine learning; and user input.

8. A method as claimed in claim 1, further comprising;
   generating a hash of the executable file associated with the suspicious process, the hash including static metadata related to the executable file.

9. A method as claimed in claim 8, further comprising;
   transmitting the hash of the executable file associated with the suspicious process to a memory for further analysis.

10. A non-transitory machine-readable storage medium encoded with instructions executable by a processor for monitoring control-flow integrity in a low-level execution environment, the machine-readable storage medium comprising:

instructions to determine a file system location of an executable file associated with a suspicious process;
instructions to encrypt the file associated with the suspicious process;
instructions to create a file stub for the file associated with the suspicious process with the same file name and location as the file associated with the suspicious process; and
instructions to decrypt the file associated with the suspicious process at a different location to that of the file stub.

11. A non-transitory machine-readable storage medium as claimed in claim 10, further comprising:
instructions to process a request, using the stub, to execute the suspicious process; and
instructions to execute a payload associated with the suspicious process.

12. A non-transitory machine-readable storage medium as claimed in claim 10, further comprising:
instructions to execute a payload of the file associated with the suspicious process in an isolated execution environment.

13. A system comprising a processor coupled to a memory to perform the function of regulating execution of a suspicious process, the system configured to:
determine a file system location of an executable file associated with the suspicious process;
encrypt the file associated with the suspicious process;
create a wrapper for the file associated with the suspicious process with the same file name and location as the file associated with the suspicious process; and
placing the encrypted file in a different location to the wrapper.

* * * * *